United States Patent [19]

Fraser

[11] Patent Number: 5,235,745

[45] Date of Patent: * Aug. 17, 1993

[54] METHOD OF REPAIRING TURBINE BLADES ON A ROTOR

[75] Inventor: Michael J. Fraser, Broughton Hackett, United Kingdom

[73] Assignee: Refurbished Turbine Components Limited, Droitwich, United Kingdom

[ * ] Notice: The portion of the term of this patent subsequent to Jan. 21, 2009 has been disclaimed.

[21] Appl. No.: 915,130

[22] Filed: Jul. 17, 1992

Related U.S. Application Data

[62] Division of Ser. No. 539,996, Jun. 18, 1990, Pat. No. 5,149,073.

[30] Foreign Application Priority Data

Jun. 20, 1989 [GB] United Kingdom .................. 8914156

[51] Int. Cl.$^5$ .............................................. B23P 15/00
[52] U.S. Cl. .................................. 29/889.1; 29/402.06
[58] Field of Search ............. 29/889.1, 402.01, 402.02, 29/402.03, 402.04, 402.05, 402.06

[56] References Cited

U.S. PATENT DOCUMENTS

| | | | |
|---|---|---|---|
| 1,515,915 | 11/1924 | Valenta . | |
| 1,556,882 | 10/1925 | Weaver . | |
| 2,468,884 | 5/1949 | Esperance . | |
| 3,830,488 | 8/1974 | Wilger et al. | 269/296 |
| 3,879,026 | 4/1975 | Lappin, Jr. | 269/55 |
| 4,009,874 | 3/1977 | Hughey | 269/3 |
| 4,095,451 | 6/1978 | Watton | 29/889.1 |
| 4,866,828 | 9/1989 | Fraser | 29/889.1 |
| 4,896,408 | 1/1990 | Fraser | 29/889.1 |
| 4,951,390 | 8/1990 | Fraser et al. | 29/889.1 |
| 4,953,776 | 9/1990 | Fraser | 29/889.1 |
| 5,067,234 | 11/1991 | Fraser | 29/889.1 |
| 5,081,765 | 1/1992 | Fraser et al. | 29/889.1 |

*Primary Examiner*—Irene Cuda
*Attorney, Agent, or Firm*—Armstrong, Westerman, Hattori, McLeland & Naughton

[57] ABSTRACT

Apparatus for use in repairing turbine rotors includes a stand which supports a turbine rotor at positions spaced along its axis, the stand further including work stations to providing a work surface extending alongside a blade positioned in an array of blades on the rotor. A stop prevents movement of the rotor relative to the work station so that work operations can be carried out on a blade. The rotor may then be rotated about its axis until an adjacent blade is brought into proximity with the work station whereafter that blade may also be repaired and so on until all the blades have had the necessary repairs carried out thereto. The work surfaces may receive machine tools and other apparatus for the repair of the blades. A plurality of work stations may be provided enabling the simultaneous repair of a plurality of blades on the rotor thereby considerably decreasing the time necessary to carry out full repair to the rotor.

3 Claims, 4 Drawing Sheets

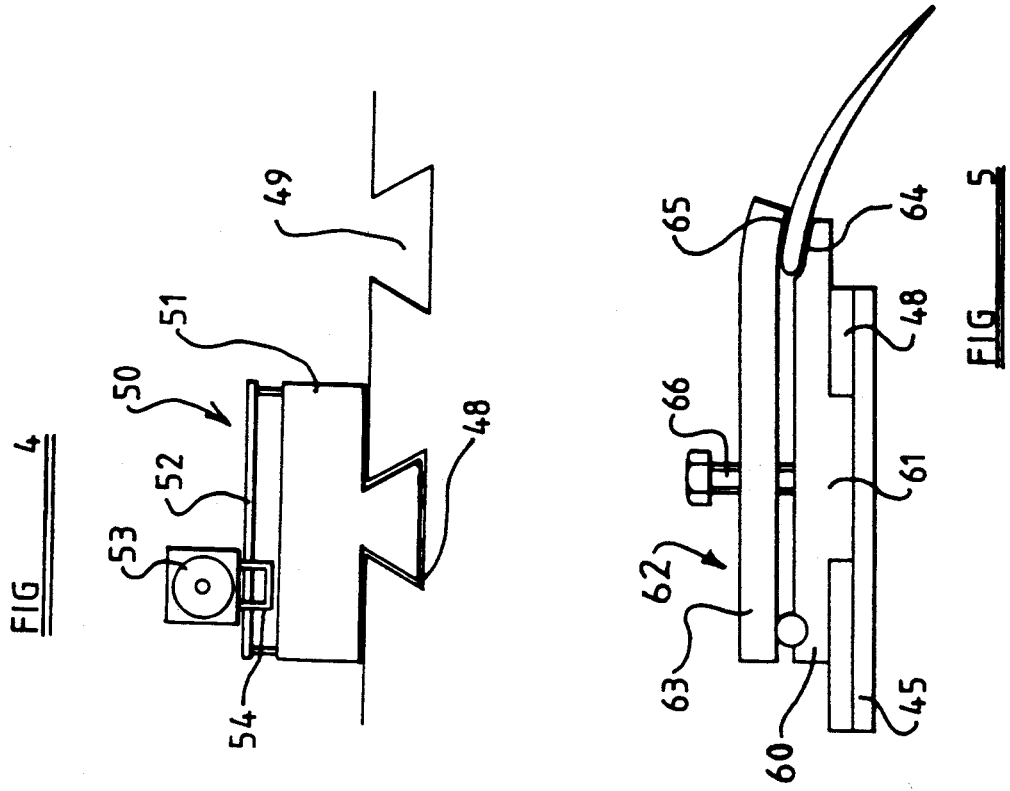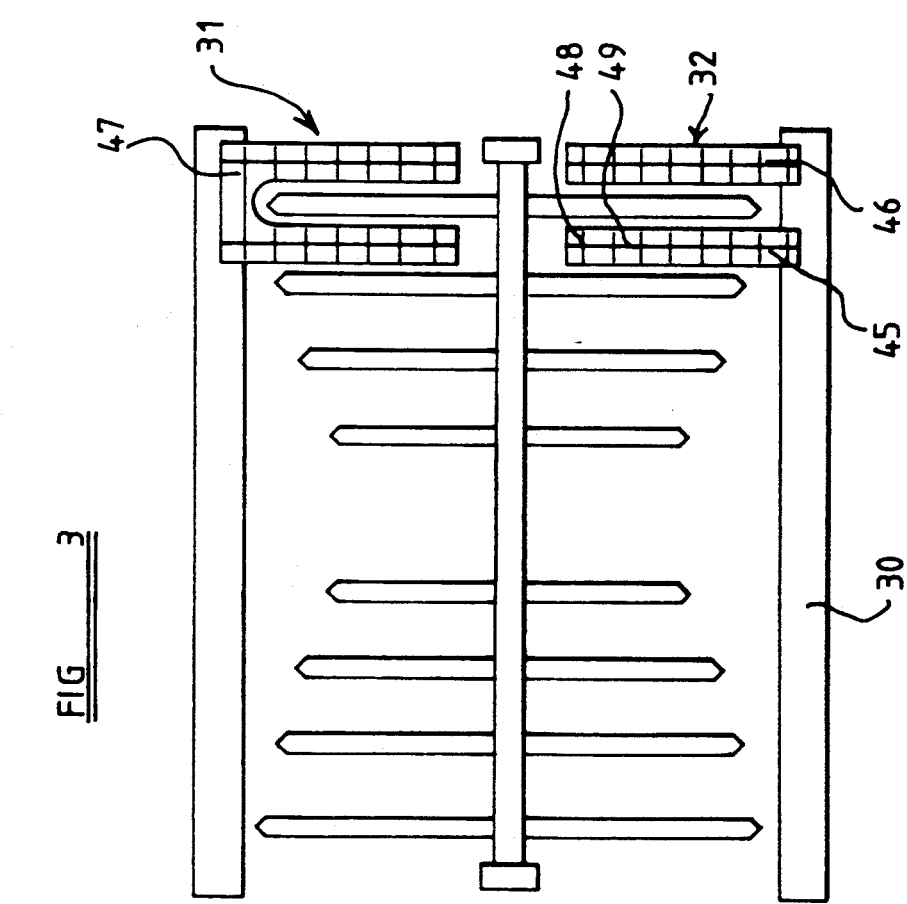

METHOD OF REPAIRING TURBINE BLADES ON A ROTOR

This is a division of application Ser. No. 07/539,996 filed Jun. 18, 1990, now U.S. Pat. No. 5,149,073.

BACKGROUND TO THE INVENTION

Field of the Invention

The present invention relates to apparatus for use in the repair of machines and is primarily but not exclusively concerned with apparatus for supporting and/or the transportation of and/or the repair of rotors in turbine machines, in particular rotors from electricity generating steam turbines.

Turbine rotors are subjected to wear and damage during use and the occurrence of damage, for example the breaking of one or more turbine blades, may necessitate immediate repair.

Irrespective of any damage requiring immediate repair, because of the wear to which the blades are subjected during use, after a period of time it will be necessary for some renovation to be carried out.

It is usual when carrying out repair or renovation to dismantle the turbine, remove the rotor from the turbine and subsequently remove the blades from the rotor. The removal of the blades and the rotor itself can cause considerable damage to the blade and require eventual replacement thereof.

On re-assembly, the subsequent re-alignment of the blades in a rotor with respect to each other and replacement of lacing wires and shrouds is also time consuming which not only leads to considerable expense but prolongs the out-of-use time of the turbine.

Applicant has already proposed many different methods of repair enabling repair of turbine blades to be carried out with turbine blades in situ on the rotor, i.e. without their removal therefrom.

It has been found that it is extremely difficult to carry out some repair steps whilst the blades are in situ since the accuracy required when machining the blades after repair, and re-aligning the blades relative not only to each other but to the rotor, is acute.

SUMMARY OF THE INVENTION

It is an object of the present invention to provide apparatus for use in repairing turbines and in particular the repair of turbine rotors while the blades are still in position on the rotor.

According to one aspect of the present invention, we provide apparatus adapted for the repair of a turbine rotor, said rotor having at least one array of turbine blades, said apparatus comprising:

1. a stand provided with a base connected to rotor supports, said rotor supports;
    (a) supporting the rotor at spaced positions along its length;
    (b) permitting occasional rotation of said rotor about its longitudinal axis;
2. at least one work station, said work station:
    (a) having location means adapted to locate the work station relative to said stand;
    (b) providing a work surface adapted to extend alongside a turbine blade when a rotor is positioned on said stand; and
3. stop means adapted to prevent rotation of said rotor on said stand and to prevent relative movement between a blade positioned alongside said work station relative to that work station so as to permit work operations to be carried out on said blade.

Said work station may be connected to or extend from the base part or may be formed as a separate entity and be adapted for location relative to said base part for alignment relative to datum surfaces provided on a rotor supported by said stand.

Said stand may be demountable to facilitate transport thereof so as to enable said stand to be assembled at any convenient location, for example adjacent a turbine to be repaired.

Preferably said rotor is capable of being rotated about its rotational axis so as to enable any one blade in an array of blades carried by the rotor to be positioned adjacent said work surface.

Preferably said work surface is provided with connection means whereby machine tools may be connected to said work surface to enable the work operation to be carried out on a blade in said array.

Preferably said attachment means provides for tools to be readily attached to said work surface or detached therefrom so that different tools may in succession be attached to said work surface to carry out successive operations on the blade in said array.

Said work surface may be adapted to extend from an outward position radially outwardly of a blade in a turbine blade array on a rotor in a radially inwardly direction towards the rotor axis, and conveniently said work surface may extend from said outermost position along either side of said blade wherein said work surface may be of U-shaped configuration. Alternatively, said work station may be L-shaped.

Alternatively, a pair of work surfaces may be provided each being capable of being positioned such that said work station is secured to said base in a manner that said pair of work surfaces are spaced from each other by a distance adapted to accommodate a blade in said turbine blade array.

Preferably said support is provided with two or more work stations permitting of a plurality of blades on the rotor to have work carried out thereon at the same time.

Preferably the work surface provided on said work station is adapted for accurate location of machine tools, for example drilling machines, cutting machines, welding machines, clamping devices etc., and conveniently an arrangement may be provided whereby a machine tool or the work surface is provided with a groove to accurately locate a machine tool or clamping device relative to the work surface and conveniently permit of movement of the machine tool or clamping device relative to the work surface in pre-adjusted increments.

Clamping means may be provided to firmly secure the machine tool at a predetermined position on the work surface.

Conveniently, the work surface may be formed so that a pair of tools, for example a clamping device adapted to clamp and support a turbine blade, and a drilling machine, may be used in conjunction with each other so that the drilling of the blade may take place once the blade is firmly clamped in a predetermined position.

Preferably said support means is adapted to permit of rotation of said rotor whilst on said stand and conveniently support surfaces may be provided, for example rollers or other bearing means, whereby the rotor may be rotated about its rotational axis.

Conveniently said stand may be provided with manually operable means to rotate said motor and incremental means may be provided whereby said rotor may be turned through a predetermined angle.

Preferably said support means further includes transit support means adapted to replace said bearing or other rotor support means, whereby said rotor may be firmly located relative to said support stand during transit, for example on a vehicle.

Preferably said transit support means may comprise blocks, for example of plastic or wood or other material, soft compared with the material from which the rotor shaft is made to prevent damage occurring to the rotor shaft during transit.

Said stand may be provided with jack means, for example hydraulic rams, adapted to be energisable to lift or otherwise support said rotor to enable the transfer of said transport support means to roller means or other bearing means whereby after transport of said rotor, said bearing means or rollers may be inserted to enable rotation of said rotor on said stand about its rotational axis.

The support part, adapted to receive the turbine rotor, may be provided with bearings and at least one of said bearings may be adjustable in height relative to the other bearing so as to enable perfect levelling of the rotor, or if required one bearing may be set higher than the other if it is required to cause axial movement of the rotor.

The stand may be made of any convenient size and may be assembled from a plurality of different parts so as to enable the stand to accommodate different sizes of rotor, said support means may be variable in height or replaceable by different height supports so as to accommodate different diameters of rotor. Said supports may be securable to a base member at different positions to accommodate different lengths of rotor.

In order to ensure proper alignment between said rotor and a work station, indicator means may be secured to the rotor shaft, for example the elongate member, so that the elongate member extends radially outwardly from the rotational axis of the rotor and said work surface may be provided with gauge means to check the distance between said alignment means and said work surface is as expected.

Gauge means may then be provided on the work surface to check the alignment of each blade in an array to check the correct position thereof and in order to ensure correct machining of a blade, the position of each blade may be checked and adjusted prior to any work operation taking place.

It is envisaged that said work surface may be provided with stop means adapted to locate on a surface of the rotor or a part attached thereto, for example a turbine blade, to prevent undesired rotation of said rotor while the work or gauging operation is being carried out.

The position of said alignment means may also be monitored to check if any axial movement of the rotor has taken place relative to said work surface.

Said work surface may be adapted to receive alignment jigs locatable in location means on said work surface to enable the correct positioning of various parts of a turbine blade to be checked rapidly so that each of the blades in the array may have its position checked prior to work operations being carried out so that once the tool has been correctly aligned for a work operation on one blade, it will be correctly aligned for work operations on the remainder of the blades in the array.

It is further envisaged that intentional misalignment of a blade may be carried out to compensate for expected movement of the blade during a work operation, for example a welding operation, due to the thermal forces involved.

It is envisaged that in addition to stop means, said work surfaces may be provided with clamp means adapted to clamp the blades relative to the work surface in one or a plurality of different spaced positions to ensure that no movement of the blades occurs during a work operation.

Preferably said stand may include a thrust bearing adapted to prevent or minimise movement of said rotor in a direction along its longitudinal axis so that said rotor is permanently in a predetermined position.

It is another object of the present invention to provide a new or improved method of repairing turbine blades.

According to another aspect of the invention, we provide a method of repairing turbine blades on a rotor comprising the steps of:

1. removing the rotor from a turbine;
2. mounting the rotor on a stand;
3. positioning a work table alongside at least one of the blades on the rotor;
4. providing means to prevent movement of said rotor relative to said work table;
5. carrying out a work operation on said blade;
6. removing the means preventing rotation of said rotor;
7. rotating said rotor to bring a second blade adjacent to said work table;
8. preventing movement of said rotor relative to said work table; and
9. carrying out a repair operation on said second blade.

Preferably said method further comprises moving said rotor to bring each blade to be repaired adjacent said work table to permit the necessary work operations to be carried out thereon.

Preferably said method further comprises the steps of providing further work stations so as to permit of repair to be carried out on a plurality of blades simultaneously.

Preferably said method includes the use of apparatus as aforedescribed.

Said additional work stations may be provided diametrically opposite each other so that two diametrically opposite blades in a single array on a rotor may be repaired simultaneously.

BRIEF DESCRIPTION OF THE DRAWINGS

The invention will now be described in more detail, by way of example only with reference to the accompanying drawings, wherein:

FIG. 3 is a diagrammatic plan view of a pair of work stations; and

FIG. 4 illustrates one embodiment of location of machine tool on a work surface;

FIG. 5 illustrates one embodiment of blade clamp;

DESCRIPTION OF THE PREFERRED EMBODIMENTS

Figure 1:
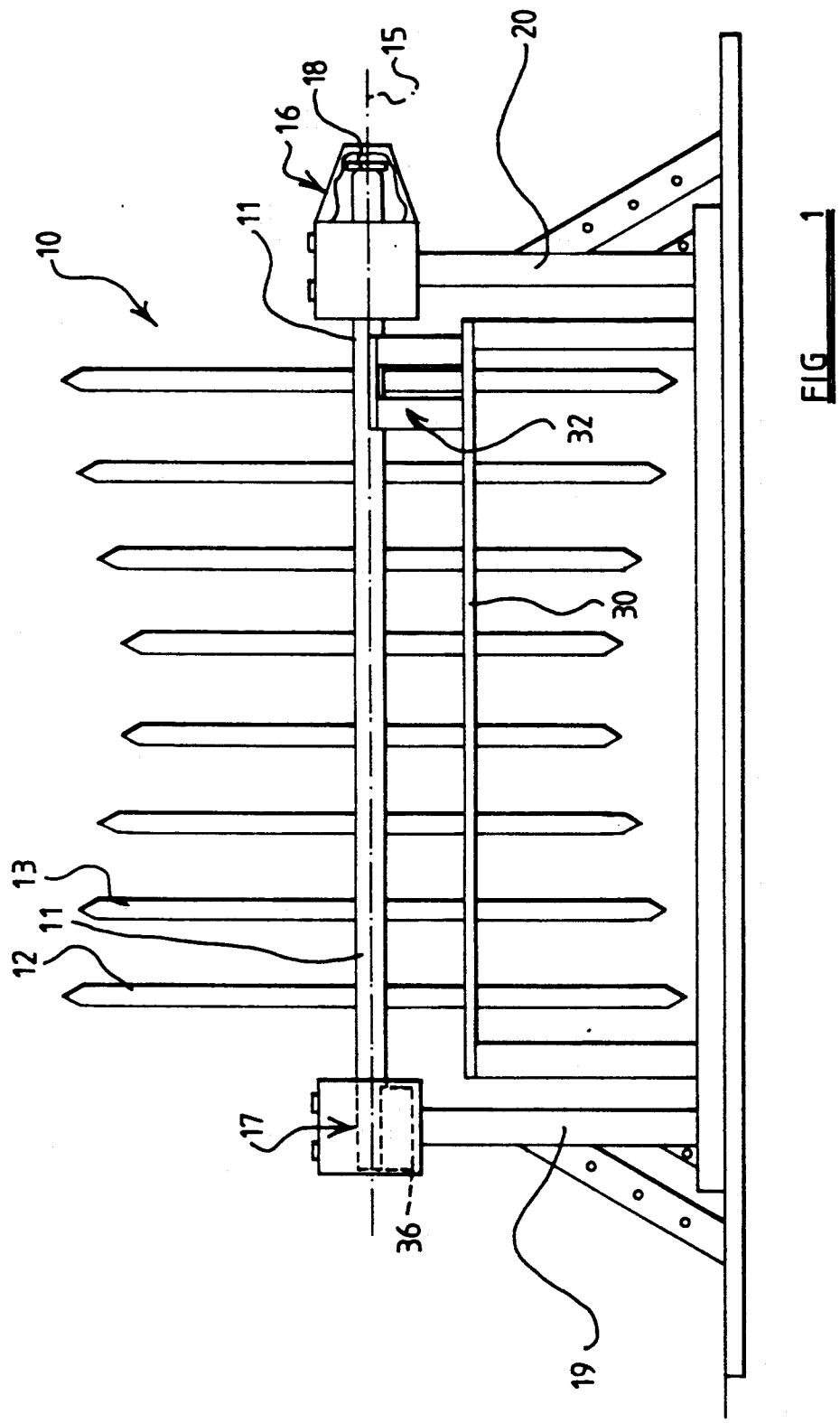
FIG. 1 is a side elevation of one embodiment of support means.

Referring firstly to FIGS. 1 and 3, a rotor is generally indicated at 10 and comprises a shaft 11 and a plurality of arrays of blades, for example those indicated at 12 and 13.

The shaft 11 is mounted for rotational movement about its longitudinal axis 15 and is supported in bearings generally indicated at 16 and 17. The bearing 16 includes a thrust bearing 18 to prevent undesired movement along the axis 15 of the rotor 10.

The bearings 17 and 18 are supported by uprights 19 and 20 respectively from a primary base member 21 and lateral base members 22, 23, 24 and 25.

Bracing members 26, 27 and 33, 34 connect the upright 19 to the base members 21 to 25 and also to work platforms generally indicated at 29 and 30, one of which is located on each side of the support stand.

Similar bracing members are provided connecting the upright 20 to the base members and work platforms.

The work platforms 29 and 30 are provided with work stations generally indicated at 31 and 32 respectively.

Figure 2:
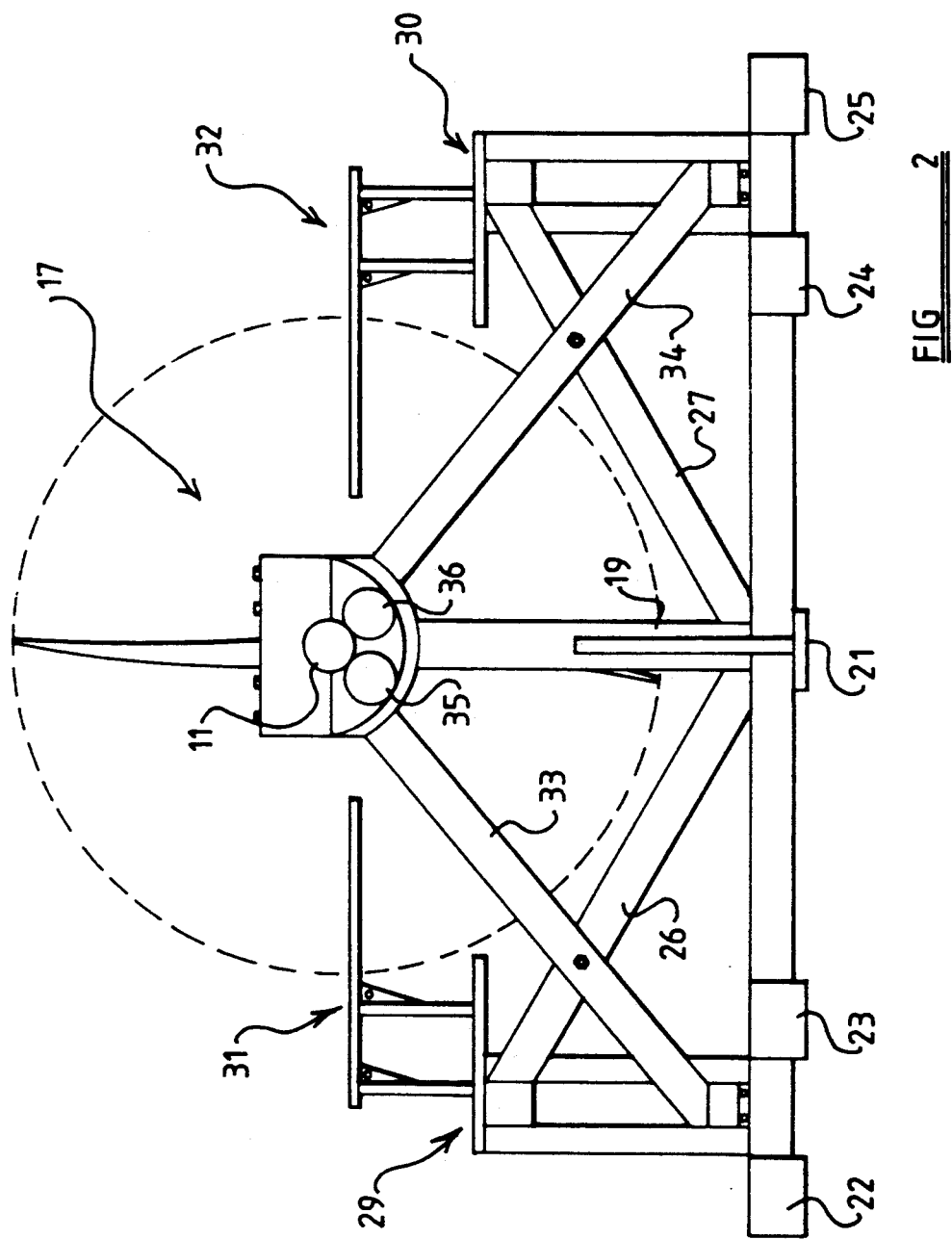
FIG. 2 is an end view of the support means shown in FIG. 1.

Referring in particular to FIG. 2, the bearing 17 is shown diagrammatically and it can be seen that the shaft 11 is supported by roller members 35 and 36 to enable the whole rotor to be rotated about its axis 15.

It will be appreciated that the other bearing 16 will be provided with similar rollers.

It is only required to rotate the rotor slowly, manual rotation of the rotor has been found to be quite acceptable to bring a specific turbine blade on which work is required to be carried out adjacent the work station 31 or 32.

The work stations 31 and 32 may be of any suitable form and may take the form of a single elongate work surface as shown at 45 and 46 on work station 32 or alternatively may comprise a U-shaped work surface as shown at 47 at work station 31.

Referring in addition to FIG. 4, a section through work surface 45 is shown and it is shown having grooves 48 and 49 of dovetail section, which grooves are adapted to receive tools such as drilling tools, cutting tools, grinding tools or clamps so that a tool, e.g. tool 50, may be accurately located relative to the work surface.

The tool 50 comprises a work surface engagement part 51 to which is secured a threaded member 52 on which is supported a machine tool, such as a drilling machine 53, engaged with the threaded member 52 by a nut-like member 54. Rotation of the threaded member 52 permits of accurate lateral adjustment of the drilling head 53 relative to the mounting part 51.

Referring now to FIG. 5, an embodiment of a clamp for clamping of blades relative to the work surface is shown, the clamp comprises two parts, a first part 60 having a protrusion 61 that engages in one of the transverse grooves 48 or 49 In a work surface 45, for example, the arrangement being such that the clamp generally indicated at 62 may be moved towards or away from a blade to be clamped.

The clamp comprises a second part 63 which bears on the first part 60 and the first and second parts 60 and 63 have at one end blade engaging formations 64 and 65, the arrangement being such that the clamp 62 may be brought into engagement with a blade and the threaded fastener 66 is then tightened to bring the blade engaging formations 64 and 65 into engagement with the blade further tightening of the fastener 66 firmly clamping the blade relative to the work surface 45. This ensures that the blade is secured relative to the work surface 45 and hence will not move whilst machining operations are carried out thereon thus ensuring accurate machining of the blade.

It will be appreciated that the embodiment of clamp shown is merely illustrative of the type of clamp that may be used and any suitable form of clamping may be used in order to firmly locate a blade on which work is required to take place relative to the work surface.

The tools adapted to co-operate with the work surfaces may have any suitable location means on the work surface and may be adapted for bolting or otherwise securing in a firm manner to the work surface, means for causing adjustment of the tool relative to the turbine blade being provided on the tool itself. The tools may be powered by any suitable power source, e.g. electric or hydraulic, or may be hand tools adapted for manual operation.

It is envisaged that in many cases, tools will be used in conjunction with clamping means whereby the clamping means holds a turbine blade in a firm position whilst a work operation, such as a drilling or machining operation is carried out to ensure utmost accuracy during the repair process.

Alignment tools may also be adapted for use on said work surfaces, the arrangement being such that once the work station is accurately positioned, alignment tools may be attached to the work surface or from a part of the work station, the alignment means being provided with alignment surfaces adapted to indicate the correct position of various spaced surface parts of the turbine blade.

The stand and work station, particularly where the work station comprises a table that extends along both sides of the blade, is of very considerable benefit in permitting of correct gauging of a blade, that is checking that the shape and form of a repaired blade is correct.

Gauging tools may comprise profiled members intended to be placed alongside both surfaces of the blade at predetermined stations along its length, the profiles being indicative of the correct shape of the blade such that if the profiled members do not fit properly against the surface of the blade and the blade is of incorrect shape.

Figure 6:
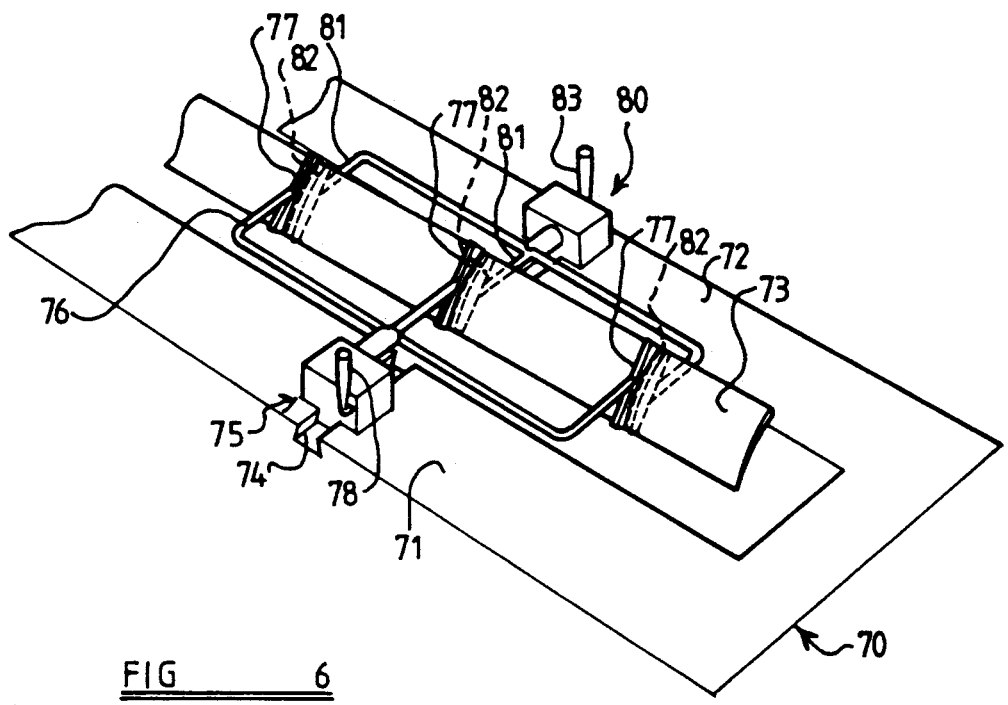
FIG. 6 illustrates an embodiment of blade gauging apparatus.

Referring to FIG. 6, a type of gauging apparatus is shown diagrammatically.

A work station generally indicated at 70 has two limbs 71 and 72 extending on opposite sides of the blade 73, the limb 71 having a guide 74 in which is secured a gauging tool generally indicated at 75.

The gauging tool 75 has a plurality of arms to each of which is secured a gauging member 77. The gauging member 77 will have a profile that is intended to match exactly the profile of the blade 73 at its intended point of contact.

The gauge members 77 are mounted for movement relative to the gauging tool 75 and a manually operable handle 78 is provided which is capable of moving the gauging members 77 into and out of engagement with the blade 73. Such movement enables the gauging members 77 to be withdrawn from the blade so as to permit the rotor to be rotated on the stand to bring the next blade into position so that the form of the blade may be checked by the gauging tool.

A second gauging tool is indicated at 80, which gauging tool also has a plurality of arms 81 each provided with a gauging member 82. In this case the gauging tool is intended to check the form of the concave side of the blade 73 and in a manner similar to the gauging tool 75, the gauging tool 80 is provided with a manually operable handle 83 to permit of movement of the gauging members 82 into and out of engagement with the blade 73.

The U-shaped table 70 permits of simultaneous gauging or checking of form of a single blade from both the convex and concave sides and therefore enables the exact form and shape of a repaired blade to be checked very accurately.

It is intended that stop means or other locating means to stop the blade 73 in an exact position relative to the work table 70 will be employed so that the gauging tools 75 and 80 are mounted on the table 70 then the blades in a rotor array may be checked in a fast and efficient manner without further adjustment of the gauging tools 75 and 80 being necessary.

Figure 7:
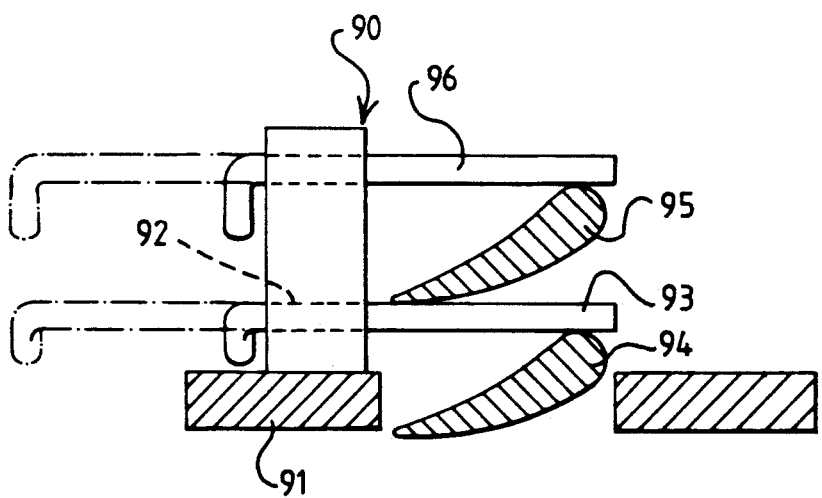
FIG. 7 illustrates an embodiment of stop means.

Referring now to FIG. 7, one embodiment of stop means is illustrated, the stop means comprising a block-like member 90 secured by any suitable means to a work station table 91, the block 90 having at least one passage therethrough 92 in which is slidably mounted a stop member 93, the stop member 93 can thus be moved into and out of engagement with turbine blades 94 and 95 so as to prevent rotation of the rotor on the stand.

When rotation is required, for example to move another turbine blade into proximity with the work station table, the stop members 93 can be withdrawn to the position as shown in dotted outline.

Since the stop member 93 is in register with both blades 94 and 95, rotation in either direction is prevented, in some cases it may be preferred to provide a second stop member 96, the position between the stop members 93 and 96 being such that they are capable of contacting a leading and trailing edge of a blade, such as the blade 95, to ensure that rotation in either direction is prevented.

The stand and work station arrangement of the present invention provides apparatus to enable accurate and speedy repair of turbine blades on a rotor without the necessity of their removal and the combination of secure work surface and tools adapted for securing thereto in predetermined aligned positions enables highly accurate machining operations to be carried out and, once an operation has been carried out on a single blade in an array, it is merely necessary to rotate the rotor by the required amount to permit of similar operations to be carried out on an adjacent blade.

When work operations involving the application of considerable thermal energy, such as welding or brazing, are required it has been found sometimes necessary to pre-distort the blade to counteract the distortion that will occur during the welding or brazing operation so as to leave the blade in a condition as free as possible from residual stress.

It is envisaged that the support of the present invention may be provided with any number of desired work stations enabling several turbine blades arrayed on a single rotor to be worked upon at the same time. It will be appreciated that it may be possible to work on diametrically opposed sides of a rotor at the same time thus considerably decreasing the down time of a rotor during repair or maintenance thereof.

The stand of the present invention may as aforementioned be made with a plurality of demountable parts which may be adapted for rapid assembly on site adjacent a turbine so that the rotor may be lifted from the turbine, placed directly on the stand and once the work stations have been aligned thereto the repair work may begin immediately. Thus, not only time is saved but also a considerable expense is saved compared with transport and cranes necessary to move the rotor from one site to another.

The embodiments of stand and work station illustrated are merely examples of many different alternatives that could be provided and it is envisaged that the work station and/or work surface may have alternative configurations adapted to suit the requirements of the repair operations to be carried out to the turbine.

The features disclosed in the foregoing description, or the following claims, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A method of repairing turbine blades on a rotor of a turbine comprising:

removing the rotor from the turbine;

mounting the rotor on a stand;

positioning a work table alongside at least one of the blades on the rotor;

providing means to prevent movement of said rotor relative to said work table;

carrying out a work operation on said blade;

removing the means preventing rotation of said rotor;

rotating said rotor to bring a second blade adjacent to said work table;

preventing movement of said rotor relative to said work table; and carrying out a repair operation on said second blade.

2. A method as claimed in claim 1 wherein a plurality of work stations are provided and wherein said method permits simultaneous repair of a plurality of blades.

3. A method as claimed in claim 1 wherein said method includes the use of an apparatus comprising: a stand provided with a base connected to rotor supports, said rotor supports supporting the rotor at spaced positions along its length, and permitting desired rotation of said rotor about a longitudinal axis thereof; at least one work station, said work station having location means adapted to locate said work station relative to said stand, and providing a work surface adapted to extend alongside a turbine blade when the rotor is positioned on said stand; and stop means adapted to prevent rotation of said rotor on said stand and to prevent relative movement between a blade positioned alongside said work station relative to said work station so as to permit work operations to be carried out on said blade.

* * * * *